United States Patent
Kwasny et al.

(10) Patent No.: US 7,095,429 B2
(45) Date of Patent: Aug. 22, 2006

(54) FORMATTING INFORMATION TO BE WRITTEN ON OPTICALLY WRITABLE LABEL SIDE OF OPTICAL DISC TO MINIMIZE WRITING TIME

(75) Inventors: David M. Kwasny, Corvallis, OR (US); Paul J. McClellan, Bend, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 224 days.

(21) Appl. No.: 10/644,423

(22) Filed: Aug. 20, 2003

(65) Prior Publication Data

US 2005/0041092 A1 Feb. 24, 2005

(51) Int. Cl.
*B41J 2/435* (2006.01)
*G11B 7/24* (2006.01)

(52) U.S. Cl. ............... 347/224; 369/275.3

(58) Field of Classification Search ........ 369/11.26, 369/292, 30.04, 30.07, 30.11, 30.12, 275.1–275.5, 369/124.01–124.02, 13.34, 13.35; 347/224–225, 347/229; 365/200; 156/387

See application file for complete search history.

(56) References Cited

U.S. PATENT DOCUMENTS

| 4,967,286 A | 10/1990 | Nomula et al. |
| 5,781,221 A | 7/1998 | Wen et al. |
| 6,019,151 A * | 2/2000 | Wen et al. ............ 156/387 |
| 6,264,295 B1 | 7/2001 | Bradshaw et al. |
| 2001/0040867 A1* | 11/2001 | Onodera et al. ........ 369/292 |
| 2004/0037176 A1* | 2/2004 | Morishima ........... 369/44.26 |
| 2004/0141385 A1* | 7/2004 | Pettigrew et al. ....... 365/200 |

FOREIGN PATENT DOCUMENTS

JP    P20020203321    7/2002

* cited by examiner

*Primary Examiner*—Hai Pham (57) ABSTRACT

A method of one embodiment of the invention is disclosed that receives information to be optically written on an optically writable label side of an optical disc. The method formats the information so that the information is optically written on a least number of tracks of the optically writable label side of the optical disc, to minimize optical writing time of the information to the optically writable label side of the optical disc.

32 Claims, 8 Drawing Sheets

FORMATTING INFORMATION TO BE WRITTEN ON OPTICALLY WRITABLE LABEL SIDE OF OPTICAL DISC TO MINIMIZE WRITING TIME

BACKGROUND OF THE INVENTION

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. In the case of DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used, but this is a laborious process: the labels must be carefully aligned on the discs, and so on. Special-purpose printers that print directly on the discs may be used, but such printers are fairly expensive. In the patent application entitled "Integrated CD/DVD Recording and Label", filed on Oct. 11, 2001, and assigned Ser. No. 09/976,877, a solution to these difficulties is described, in which a laser is used to label optical discs.

Two concerns in writing to the optically writable label side of an optical disc are image quality and speed. Users typically want the best quality of images possible when optically writing to the label side of an optical disc. However, because mass storage devices that read from and write to optical discs heretofore have been optimized for data storage, and not label marking, their characteristics may affect image quality of images written to the label sides of optical discs. Users also usually want the fastest speed when optically writing to the label side of an optical disc. Again, however, because optical disc mass storage devices have heretofore been optimized for writing to the data sides of optical discs, their characteristics may affect the speed with which the label sides of optical discs can be marked.

SUMMARY OF THE INVENTION

A method of one embodiment of the invention receives information to be optically written on an optically writable label side of an optical disc. The method formats the information so that the information is optically written on a least number of tracks of the optically writable label side of the optical disc, to minimize optical writing time of the information to the optically writable label side of the optical disc.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
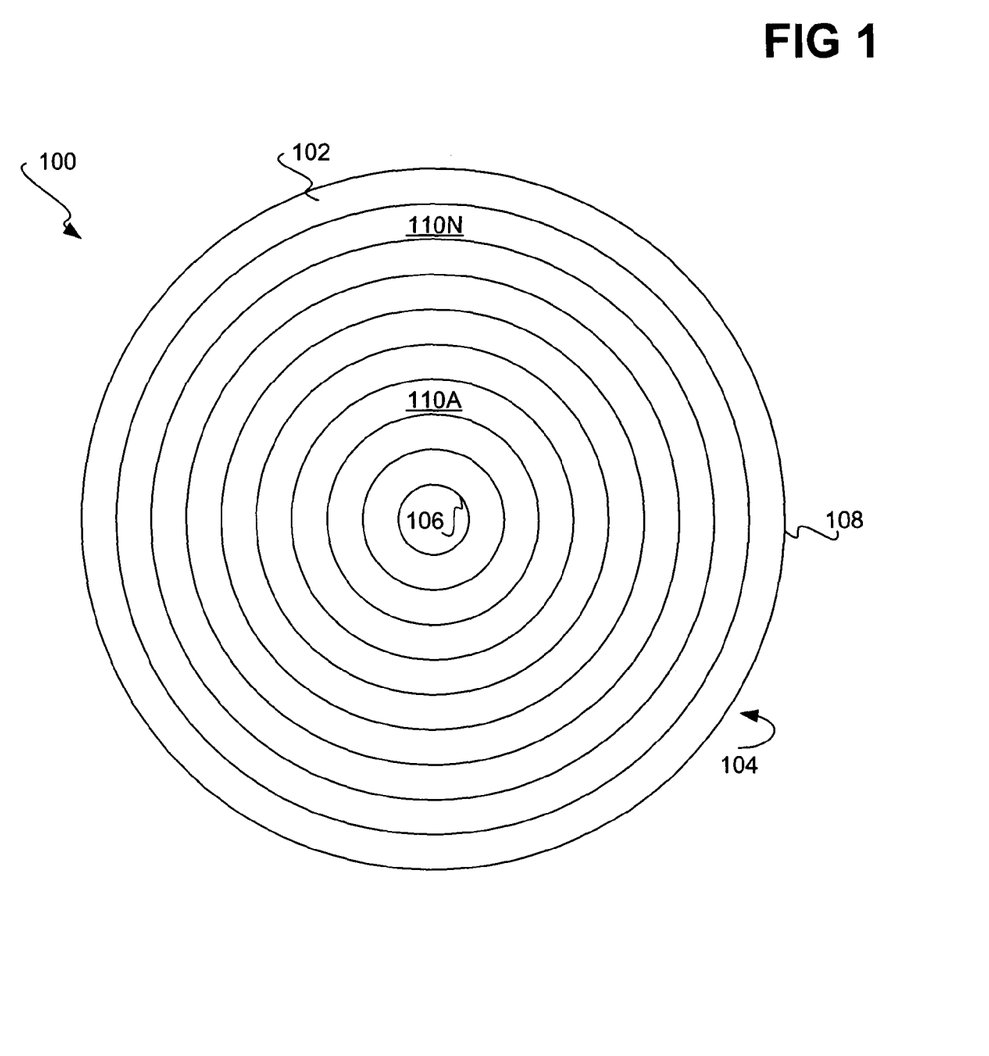
FIG. 1 is a diagram of an optical disc having an optically writable label side with a number of tracks, according to an embodiment of the invention.

FIG. 1 shows an optical disc 100, according to an embodiment of the invention. The optical disc 100 may be a compact disc (CD), a digital versatile disc (DVD), or another type of optical disc. The optical disc 100 has an optically writable label side 102, which is shown in FIG. 1, and an optically writable data side 104 on the opposite side of the optical disc 100. An example of the optically writable label side 102 is particularly disclosed in the patent application entitled "Integrated CD/DVD Recording and Label", filed on Oct. 11, 2001, and assigned Ser. No. 09/976,877. An image may be written to the label side 102, such that the pixels of the image are selectively and correspondingly optically written to the label side 102.

The label side 102 is more generally a label region, and the data side 104 is more generally a data region, in that an optically writable label region may coexist on the same side of the optical disc 100 as an optically writable data region. The optical disc 100 also has an inside edge 106 and an outside edge 108. The optical disc 100 also has a number of concentric circular tracks 110A, 110B, . . . 110N, collectively referred to as the tracks 110. There may be hundreds, thousands, or more of the tracks 110. Alternatively, the tracks 110 may be spiral tracks. An optical marking mechanism, such as a laser, may write marks, or pixels, to marking, or pixel, positions of the tracks 110. The optical marking mechanism accomplishes this by moving over each of the tracks 110, such that the optical disc 100 is rotated so that the optical marking mechanism is able to pass over the entirety of each of the tracks 110.

Figure 2:
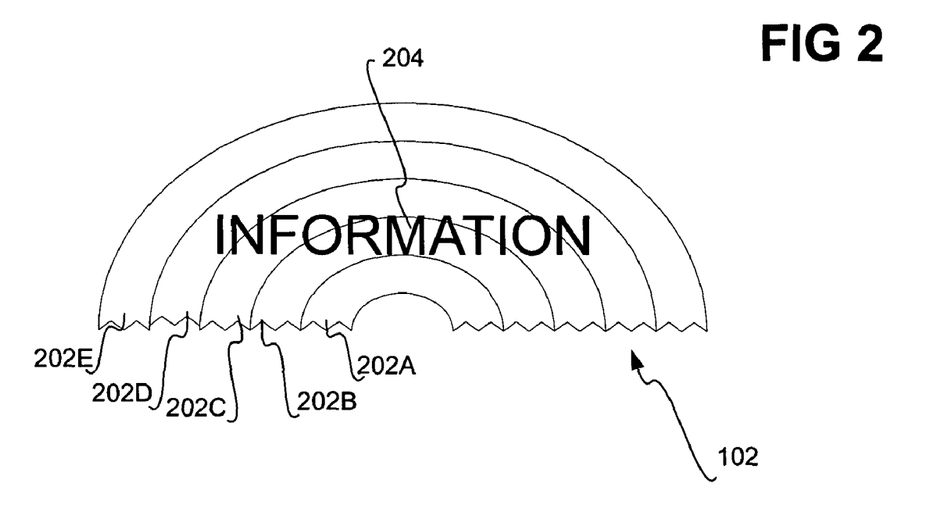
FIG. 2 is a diagram of information optically written on the tracks of an optically writable label side of an optical disc in a non-optimized manner, in accordance with which embodiments of the invention may be practiced.

FIG. 2 shows an example of information 204 that is optically written in a non-optimized manner on a number of partial tracks of the optically writable label side 102 of the optical disc 100, in conjunction with which embodiments of the invention may be implemented. The information 204 may be textual information and/or image or graphical information. Each of the partial track groups 202A, 202B, 202C, 202D, and 202E, collectively referred to as the partial track groups 202, encompasses a number of partial tracks, such as the tracks 110 of FIG. 1. For instance, each of the partial track groups 202 may encompass tens or hundreds of partial tracks. For illustrative clarity, the individual tracks of each of the partial track groups 202 are not shown in FIG. 2. The track groups 202 are partial track groups in that only a part, or section, of each of the track groups 202 is depicted in FIG. 2. The information 204 is optically written in a linear, non-optimized manner on the partial track groups 202, cutting across three particular partial track groups 202B, 202C, and 202D. For an optical marking mechanism to write the information 204, then, it has to move over each of the tracks of the track groups 202B, 202C, and 202D.

Figure 3:
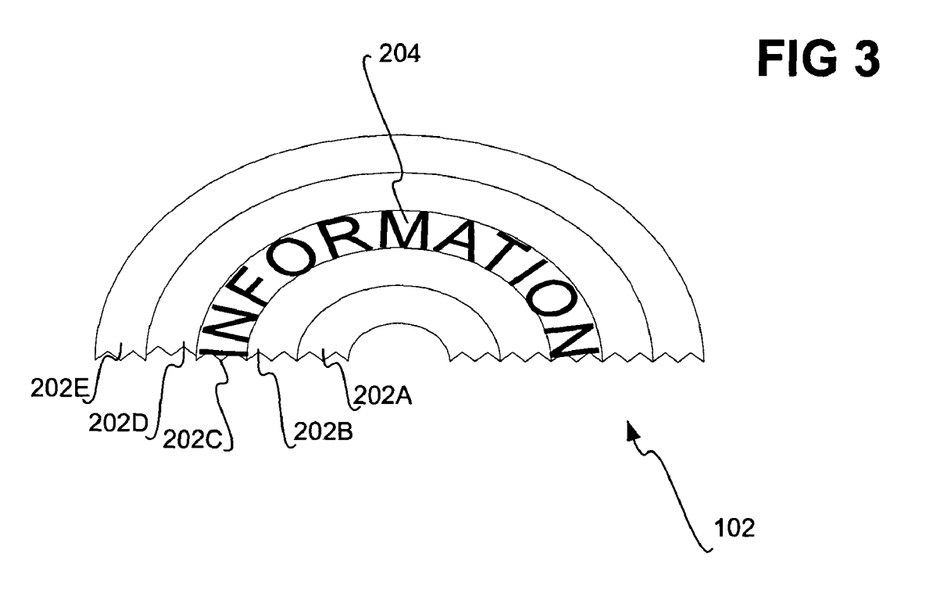
FIG. 3 is a diagram of information optically written on the tracks of an optically writable label side of an optical disc in an optimized manner, according to an embodiment of the invention.

FIG. 3 shows an example of the information 204 that is optically written in an optimized manner on the partial tracks of the partial track groups 202 of the optically writable label side 102, according to an embodiment of the invention. The information 204 is written in an optimized manner in that the information 204 is optically written on a least number of tracks of the partial track groups 202. In particular, the information 204 has been curved in accordance with the curvature of the partial track groups 202, so that all the information 204 fits within the partial track group 202C.

Therefore, optically writing the information 204 on the partial track groups 202 as depicted in FIG. 3 may mean that an optical marking mechanism just has to pass over the tracks of one partial track group, instead of having to pass over the tracks of three partial track groups in the example of FIG. 2. This minimizes optical writing time of the information 204 to the optically writable label side 102 of the optical disc 100, because the optical marking mechanism can be moved to the first track of the track group 202C, and then has to pass over just the tracks of the track group 202C. The optical writing time of the information 204 is reduced from the time needed to pass over the track groups 202B, 202C, and 202D in FIG. 2 to just the time needed to pass over the track group 202C.

Therefore, in one embodiment of the invention, the information to be written on an optically writable label side of an optical disc is curved in accordance with the curvature of the circular concentric tracks of the optically writable label side. Curving the information in this way enables the information to be formatted so that it is optically written on the least number of tracks of the optically writable label side, as opposed to optically writing the information in a linear fashion such that the information cuts across a larger number of tracks of the label side. By having the information formatted so that it fits on the least number of tracks of the optically writable label side, optical writing time of the information is minimized, without having to decrease the size of the information, such as the font size or height of textual information.

Figure 4:
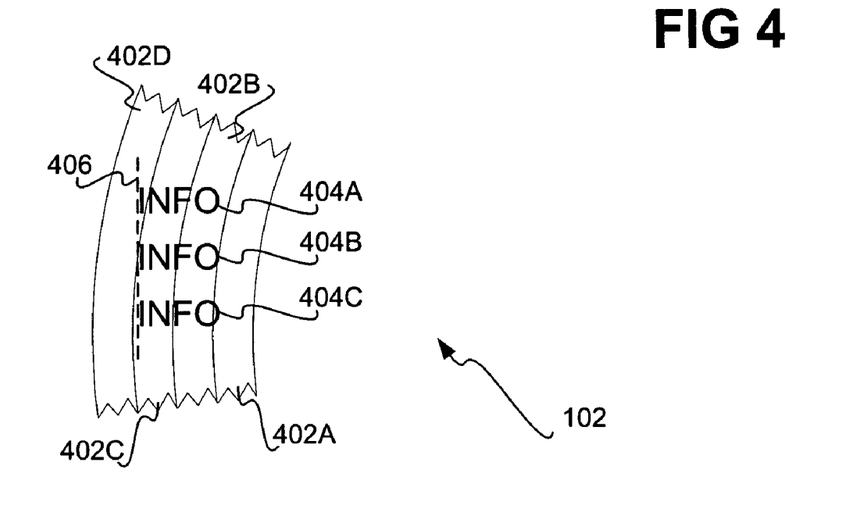
FIG. 4 is a diagram of lines of information optically written on the tracks of an optically writable label side of an optical disc in a non-optimized manner, in accordance with which embodiments of the invention may be practiced.

FIG. 4 shows an example of a number of lines of information 404A, 404B, and 404C that are optically written in a non-optimized manner on a number of partial tracks of the optically writable label side 102 of the optical disc 100, in conjunction with which embodiments of the invention may be practiced. The lines of information 404A, 404B, and 404C are collectively referred to as the lines of information 404, and may be textual information and/or image or graphical information. Each of the partial track groups 402A, 402B, 402C, and 402D, collectively referred to as the partial track groups 402, encompasses a number of partial tracks, such as the tracks 110 of FIG. 1. For illustrative clarity, the individual tracks of each of the partial track groups 402 are not shown in FIG. 4.

The successive lines of information 404 are optically written in a non-optimized manner on the partial track groups 402 such that the beginning of each of the lines of information 404 is aligned along a common vertical edge, depicted in FIG. 4 as a dotted line 406 for illustrative clarity, that cuts across the track groups 402C and 402D. Thus, the line of information 404A begins in the partial track group 402D, whereas the lines of information 404B and 404C begin in the partial track group 402C. The lines of information 404 end in the partial track group 402B or 402A. Therefore, optically writing the lines of information 404 on the partial track groups 402 as depicted in FIG. 4 means that an optical marking mechanism has to pass over at least some of the tracks of the partial track groups 402A and 402D, so that the line of information 404A can be completely written to the optically writable label side 102.

Figure 5:
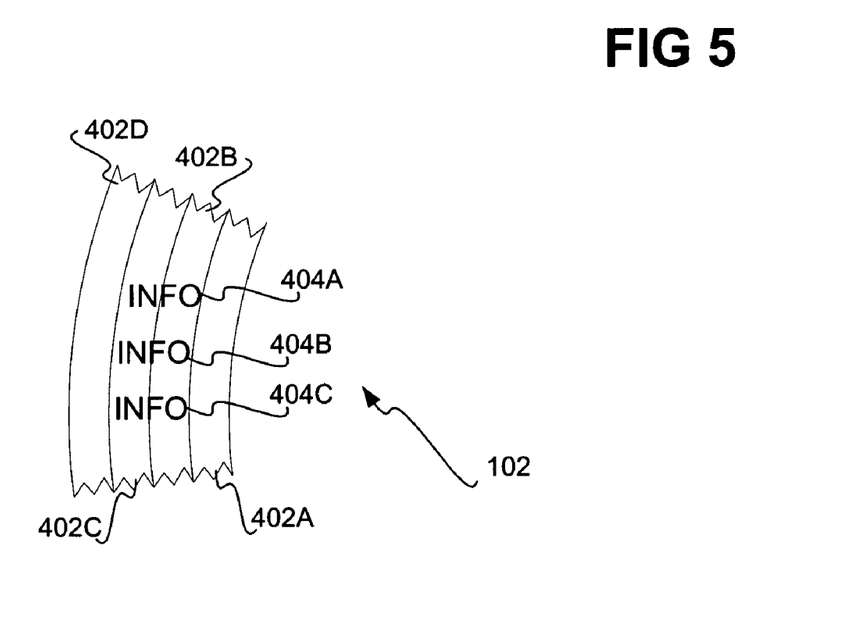
FIG. 5 is a diagram of lines of information optically written on the tracks of an optically writable label side of an optical disc in an optimized manner, according to an embodiment of the invention.

FIG. 5 shows an example of the lines of information 404 that are optically written in an optimized manner on the partial track groups 402 of the optically writable label side 102 of the optical disc 100, according to an embodiment of the invention. The lines of information 404 is written in an optimized manner in that the information 404 is optically written on a least number of tracks of the partial track groups 402. In particular, the lines of information 404 have been formatted such that each of the lines of information 404 begins, or starts, within the same partial track group 402C. That is, the beginning of each of the successive lines of information 404 is aligned along a common curved edge 502, which separates the partial track group 402C from the partial track group 402D.

Therefore, optically writing the lines of information 404 on the partial track groups 402 as depicted in FIG. 5 may mean that an optical marking mechanism just has to pass over the tracks of the track groups 402B and 402C, instead of also having to pass over the track groups 402A and 402D, as in the example of FIG. 3. This minimizes optical writing time of the lines of information 404 to the label side 102, because the optical marking mechanism is finished writing the lines of information 404 once it has passed over the tracks of the track group 402C, and does not have to pass over any of the tracks of the track group 402D. Further, the mechanism can start writing on a track of the track group 402B, and can skip the tracks of the track group 402A. By comparison, in the example of FIG. 4, the optical marking mechanism does have to pass over some tracks of the track groups 402A and 402D to finish writing the lines of information 404. The optical writing time of the lines of information 404 is reduced from the time needed to pass over all the track groups 402 in FIG. 4 to the time needed to pass over just the track groups 402B and 402C.

Therefore, in one embodiment of the invention, the information to be written on an optically writable label side of an optical disc is formatted such that successive lines of the information start within a same track, as opposed to starting on a vertical edge that cuts across more than one track. Formatting the lines of information in this way enables the information to be optically written on the least number of tracks of the optically writable label side. Optical writing time of the lines of information is thus minimized.

Predetermined Areas for Writing Information to Label Side

Figure 6:
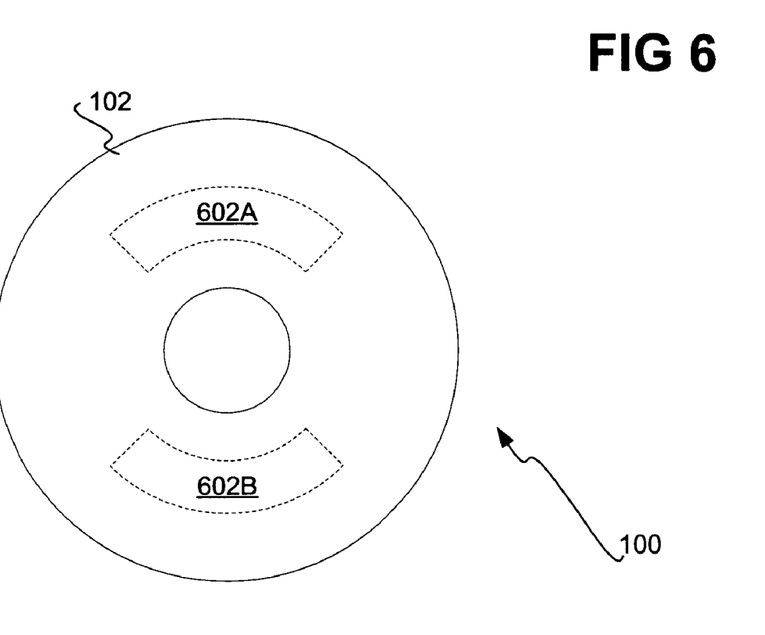
FIG. 6 is a diagram of an optically writable label side of an optical disc having two predetermined areas to which information is to be optically written, according to an embodiment of the invention.

FIG. 6 shows the optically writable label side 102 of the optical disc 100 having predetermined areas 602A and 602B within which information can be optically written, according to an embodiment of the invention. The predetermined areas 602A and 602B are referred to collectively as the predetermined areas 602. Information to be written to the optically writable label side 102 is thus formatted to fit either or both of the predetermined areas 602. That is, information to be written to the optically writable label side 102 is formatted to fit the least number of tracks, identified specifically as the predetermined areas 602, each of which encompass a number of partial track lengths. This minimizes optical writing time of the information to the label side 102.

Preferably, the predetermined areas 602 are located within the same tracks on the optically writable label side 102, but on different sides of these same tracks. For instance, the area 602A is located within the upper part of the tracks, whereas the area 602B is located within the lower part of the tracks. The area 602A may be referred to as the upper area, whereas the area 602B may be referred to as the lower area. The areas 602 are curved in accordance with the curvature of the tracks of the label side 102. In one embodiment, the areas 602 have the same size.

In one embodiment, the information that is optically written to the predetermined area 602A is the title of the data that is written to the optically writable data side 104 of the optical disc 100. For instance, the optically writable data side 104 may enable a user to enter in the name of the optical disc 100, such that this information is also written as text information to the predetermined area 602A. The user may also be able to enter in a different name as the title of the data on the data side 104 to be written to the area 602A. Generally, any information that a user enters to serve as identifying information of the data on the data side 104 is encompassed under the term title of the data. Furthermore, in one embodiment, the information that is optically written to the predetermined area 602B is the date when the data on the optically writable data side 104 was written to the data side 104.

In another embodiment, the information that is optically written to the predetermined area 602A is the name of the album or the artist of the songs that are written as audio data to the optically writable data side 104 of the optical disc 100. For instance, the optically writable data side 104 may have audio data written such that the optical disc 100 functions as a standard audio compact disc (CD), or the data side 104 may have audio data written in accordance with the MP3 or another audio information compression format. Where the predetermined area 602A has the name of the album written thereto, the predetermined area 602B may optionally have the name of the artist written thereto, and vice-versa. Where the songs that are written as audio data to the data side 104 do not correspond to a specific artist and/or album, other titles or names may be written to the areas 602 that identify the songs, and such other titles or names are encompassed by the terms album name and artist name.

Figure 7:
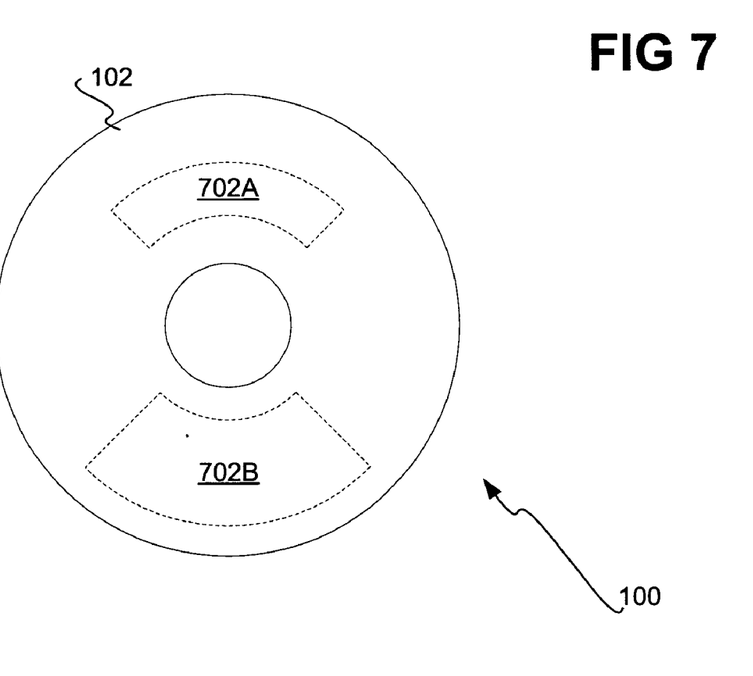
FIG. 7 is a diagram of an optically writable label side of an optical disc having two predetermined areas to which information is to be optically written, according to another embodiment of the invention.

FIG. 7 shows the optically writable label side 102 of the optical disc 100 having predetermined areas 702A and 702B within which information can be optically written, according to an embodiment of the invention. The predetermined areas 702A and 702B are referred to collectively as the predetermined areas 702. Information to be written to the label side 102 is thus formatted to fit either or both of the predetermined areas 702. That is, information to be written to the label side 102 is formatted to fit the least number of tracks, identified specifically as the predetermined areas 702, each of which encompasses a number of partial track lengths. This minimizes optical writing time of the information to the label side 102.

The predetermined area 702B is larger in size than the predetermined area 702A. Preferably, the tracks within which the area 702A is located are encompassed by the tracks within which the area 702B is located. The area 702A may be referred to as the upper area, whereas the area 702B may be referred to as the lower area. The areas 702 are curved in accordance with the curvature of the tracks of the optically writable label side 102.

In one embodiment, the information that is optically written to the predetermined area 702A is the title of the data that is written to the optically writable data side 104 of the optical disc 100, as has been described in conjunction with the area 602A of FIG. 6. Furthermore, in this embodiment, the information that is optically written to the predetermined area 702B includes the names of the individual tracks or files of the data on the optically writable data side 104. For example, the data on the data side 104 may include four files, such that the file names of the files are written to the predetermined area 702B. As another example, the data on the data side 104 may include four tracks of data, such that the names of the tracks are written to the predetermined area 702B.

In another embodiment, the information that is optically written to the predetermined area 702A is the name of the album or artist of the songs that are written as audio data to the optically writable data side 104 of the optical disc 100, as has been described in conjunction with the area 602A of FIG. 6. Furthermore, in this embodiment, the information that is optically written to the predetermined area 702B includes the names of the individual songs that have been written on the optically writable data side 104. The song names may correspond to individual tracks on the data side 104 in the case of a standard audio CD, or may correspond to individual audio files in the case of audio data written on the data side 104 in accordance with the MP3 or another audio information compression format.

It is noted that whereas the embodiments of the invention of FIGS. 6 and 7 have been described as having two predetermined areas 602 and 702, respectively, on which information is optically written, other embodiments of the invention are not so limited. For instance, there may be a single, circular area around the entirety of the optically writable label side 102 of the optical disc 100, on which curved information can be written that does not have all of the tracks 110 written thereto. Furthermore, whereas the predetermined areas 602 and 702 have upper and lower areas, they may alternatively be left and right areas, upper left and lower right areas, or upper right and lower left areas, and so on.

Methods and System

Figure 8:
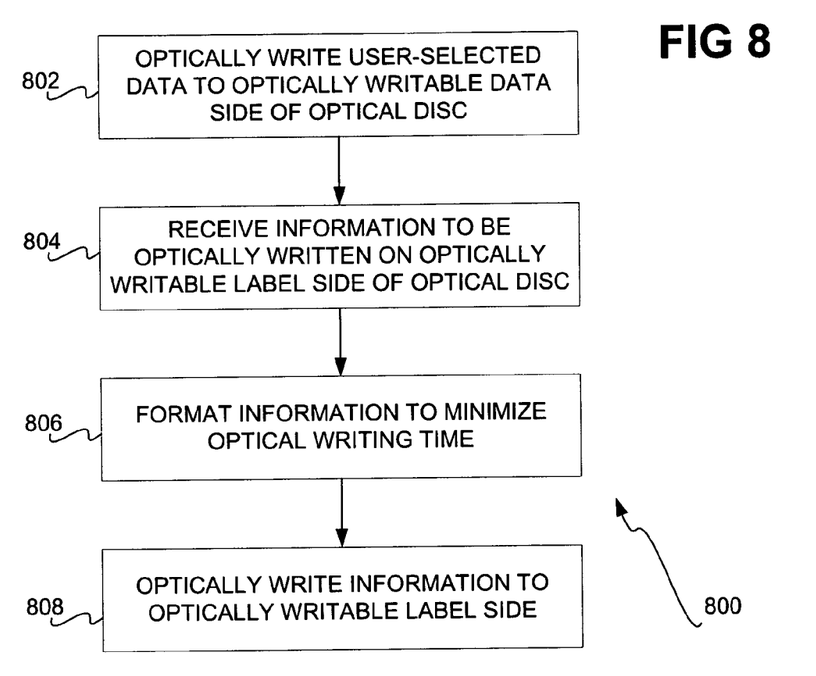
FIG. 8 is a flowchart of a method, according to an embodiment of the invention.

FIG. 8 shows a method 800, according to an embodiment of the invention. User-selected data is first optionally optically written to the optically writable data side 104 of the optical disc 100 (802). The data may be audio, or music, data or another type of data. For example, the data may include a number of songs written to the data side 104 as MP3 files, audio compact disc (CD) tracks, and so on. The data may also include a number of non-audio data files written to the data side 104 on the same or separate tracks.

Information that is to be optically written on the optically writable label side 102 of the optical disc 100 is then received (804). This information may be extracted from the data written to the optically writable data side 104, such that the user does not have to reenter any information. For instance, in the case of music data, the information is received by determining the album name and/or the artist name of the music data, and/or the song names of the music data, written on the data side 104. The information may also be received by determining the title and/or the data of the data written on the data side 104, and/or the names of the files or tracks of the data written on the data side 104. The information that is received may also be the predetermined area information to be optically written to the predetermined areas 602 and 702 of FIGS. 6 and 7, respectively. The information may alternatively be received by requesting that the user enter in the information.

The information is formatted to minimize optical writing time (806). Formatting may be accomplished so that the information is formatted as has been described in conjunction with FIGS. 3, 5, 6, and/or 7. That is, the information is formatted so that it fits in the least number of tracks on the optically writable label side 102. The information finally is optically written to the optically writable label side 102 of the optical disc 100 (808).

Figure 9:
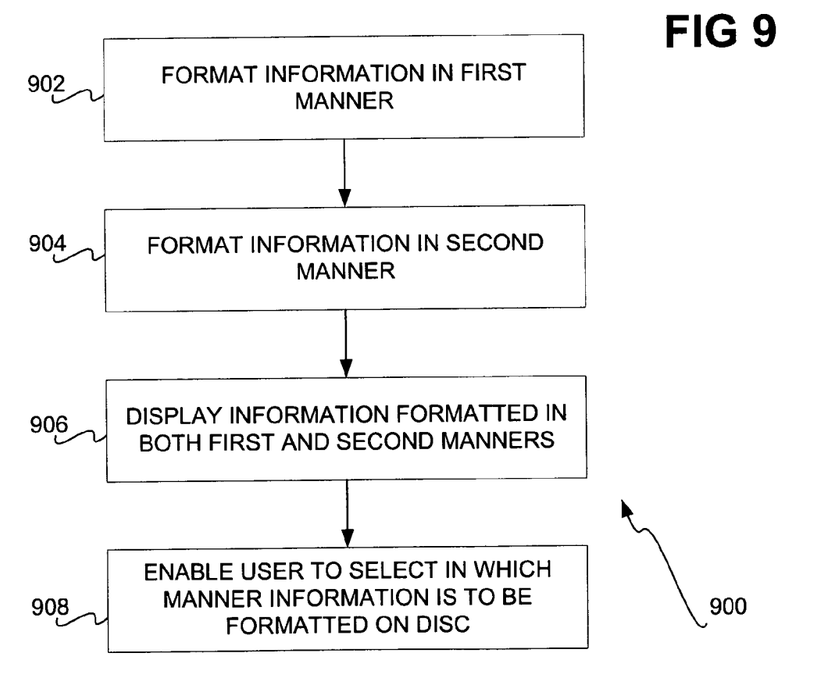
FIG. 9 is a flowchart of a method for formatting information to be written to the optically writable label side of an optical disc in two different ways for ultimate selection by an end user, according to an embodiment of the invention.

FIG. 9 shows a method 900 for formatting the information to be optically written to the optically writable label side 102 of the optical disc 100, according to an embodiment of the invention. The method 900 may be employed to perform 806 of the method 800 of FIG. 8 in one embodiment. The information is formatted both in accordance with a first manner (902) and a second manner (904). For instance, the first manner may be that which has been described in conjunction with FIG. 2 or FIG. 6, and the second manner may be that which has been described in conjunction with FIG. 3 or FIG. 7. The information as formatted in both the first and the second manners is displayed to an end user (906), so that the user is enabled to select in which manner he or she wishes the information to be formatted as optically written on the optically writable label side 102 (908). The user may also be allowed to import a rectangular graphic, that is then curved into a circular, or annular, shape via down-sampling or interpolation to achieve a uniform resolution on the tracks 110.

Figure 10:
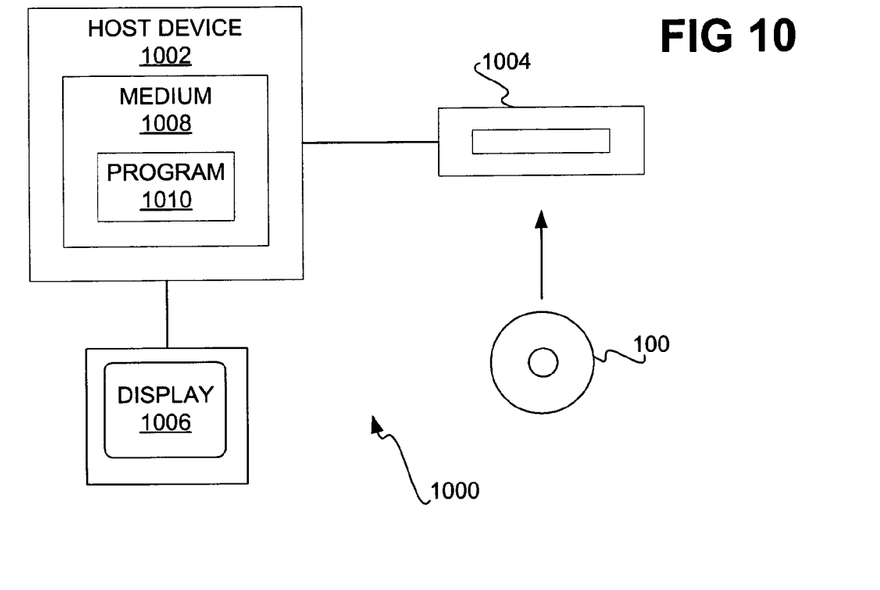
FIG. 10 is a diagram of a system having at least a mass storage device and a computer program, according to an embodiment of the invention.

FIG. 10 shows a system 1000, according to an embodiment of the invention. The system 1000 includes a host computing device 1002, a mass storage device 1004, and a display device 1006. The host device 1002 may be a computer, such as a desktop or laptop computer, or another type of computing device. The mass storage device 1004 is receptive to the optical disc 100, and is capable of writing to the optically writable label side 102 of the disc 100, and preferably to the optically writable data side 104 of the disc 100. The display device 1006 may be a flat-panel display, such as a liquid crystal display (LCD), a cathode-ray tube device, or another type of display device.

The host device 1002 includes a computer-readable medium 1008 having a computer program 1010 stored thereon. The medium 1008 may be a volatile or a non-volatile medium. The medium 1008 may also be a magnetic medium, such as a hard disk drive or a tape drive, an optical medium, such as a compact disc (CD)-type medium or a digital versatile disc (DVD)-type medium, and/or a solid-state medium, such as flash memory, dynamic-random access memory, or another type of semiconductor medium. The computer program 1010 is programmed to format information to be written on the optically writable label side 102 of the disc 100 by the mass storage device 1004 such that the information is optically written in a shortest length of time, to minimize optical writing time, as has been described. The program 1010 is executed from the medium 1008 by the host device 1002.

The host computing device 1002 is thus communicatively coupled to the mass storage device 1004 so that the information as formatted can be transferred to the mass storage device 1004 for optical writing on the label side 102 of the optical disc 100. The host computing device 1002 is communicatively coupled to the display device 1006, so that, for instance, an end user is able to approve formatting of the information prior to the mass storage device 1004 writing the information to the label side 102. The computer program 1010 may format the information as has been described in the previous sections of the detailed description.

In an alternative embodiment of the invention, the mass storage device 1004 is a stand-alone device that includes the computer-readable medium 1008 and the computer program 1010, as well as the display device 1006 embedded therein. As such, the program 1010 is stored within the mass storage device 1004, such that formatting of the information takes place completely within the mass storage device 1004. That is, optically writing to the optical disc 100 may be accomplished without the host computing device 1002.

Figure 11:
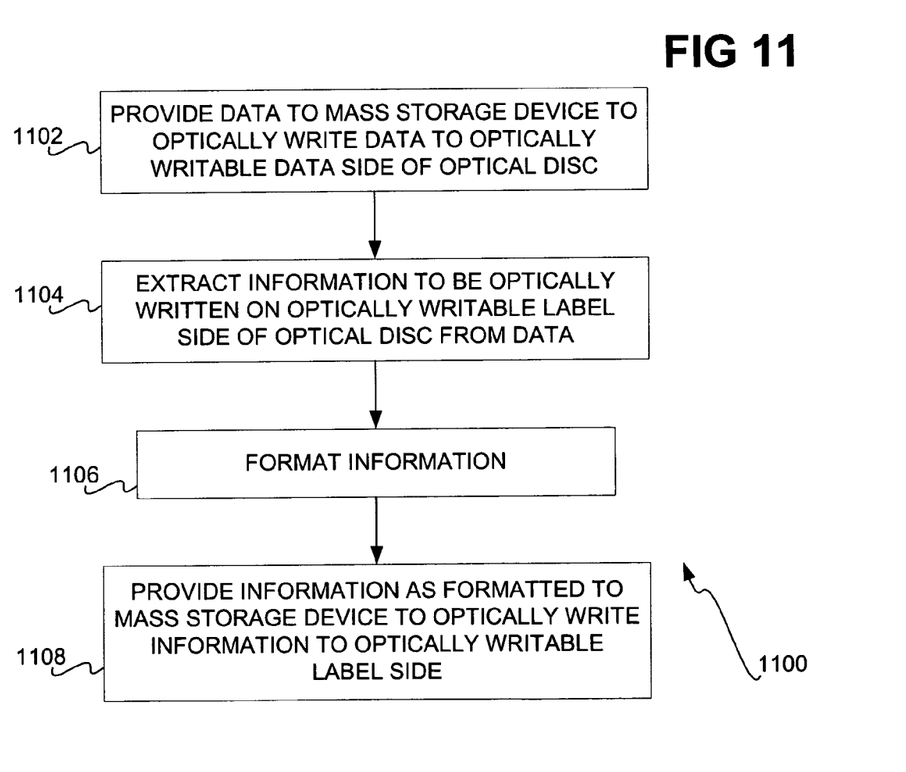
FIG. 11 is a flowchart of a method for performance by the computer program of FIG. 10, according to an embodiment of the invention.

FIG. 11 shows a method 1100 that can be performed by the computer program 1010 of FIG. 10, according to an embodiment of the invention. The program 1010 first provides data to the mass storage device 1004 to optically write the data to the optically writable data side 104 of the optical disc 100 (1102). The program 1010 then extracts information to be optically written on the optically writable label side 102 of the optical disc 100 (1104), and formats the information (1106). The information is formatted as has been described in the current and previous sections of the detailed description.

For instance, where the method 900 of FIG. 9 is performed to format the information, the information as formatted in both the first and the second manners may be provided to the display device 1006 in 906 of the method 900 to display the information to the user. As another example, data may be received from an input device corresponding to a selection of the first or the second manner in 908 of the method 900. The input device may be a keyboard, a pointing device, or another type of input device.

The information as formatted is then provided to the mass storage device 1004 (1108). The mass storage device 1004 then optically writes the information to the optically writable label side 102 of the optical disc 100. Thus, the computer program 1010 of FIG. 10, by performing the method 1100, is able to cause the mass storage device 1004 to optically write formatted information to the label side 102 of the disc 100.

Mass Storage Device and Conclusion

Figure 12:
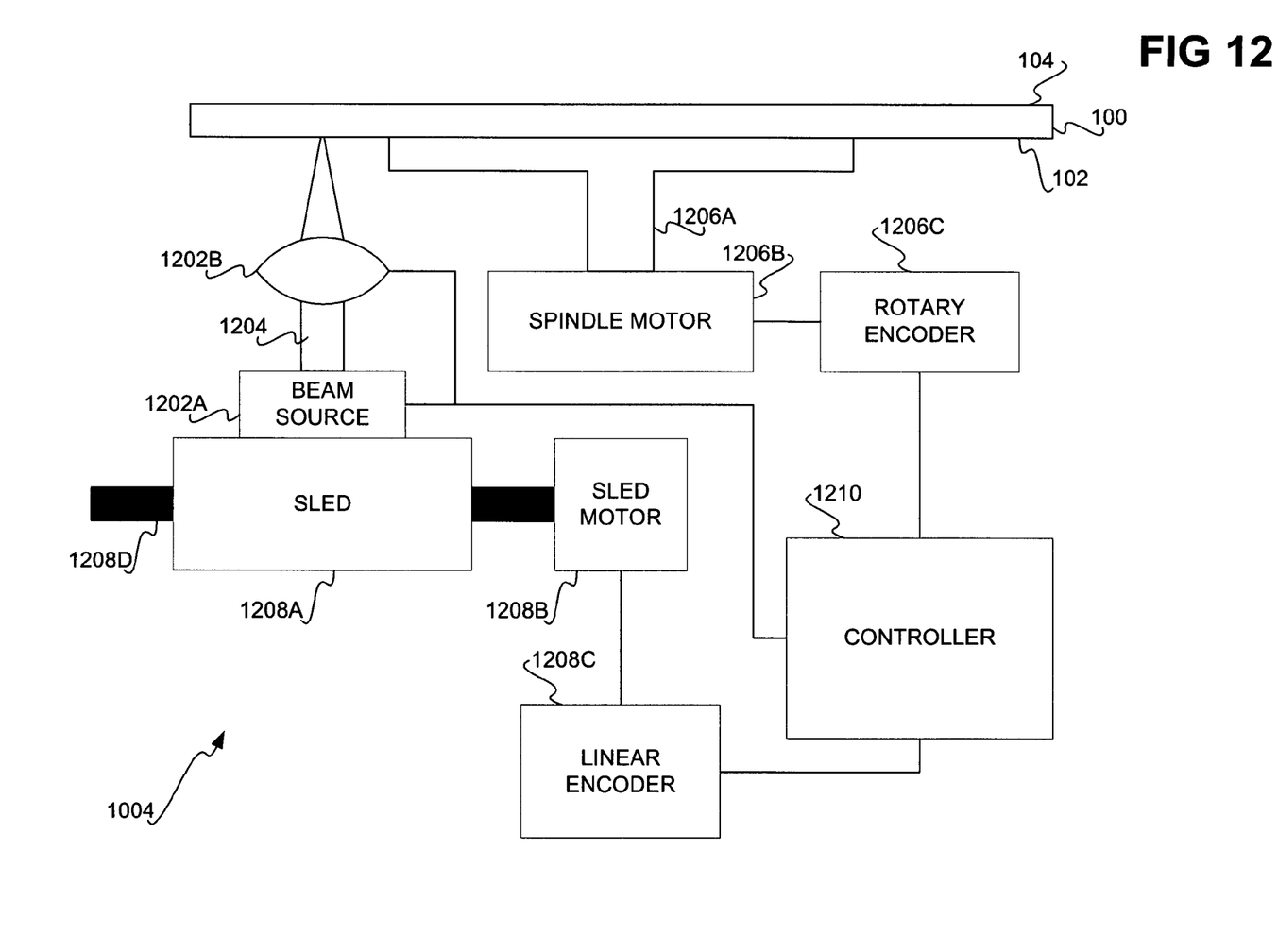
FIG. 12 is a diagram of a mass storage device, according to an embodiment of the invention.

FIG. 12 shows the mass storage device 1004, according to an embodiment of the invention. The mass storage device 1004 is for reading from and/or writing to the optical disc 100. More specifically, the mass storage device 1004 is for reading from and/or writing to an optically writable data region of the optical disc 100, and/or an optically writable label region of the optical disc 100. The mass storage device 1004 includes a beam source 1202A and an objective lens 1202B, which are collectively referred to as the optical marking mechanism 1202. The storage device 1004 also includes a spindle 1206A, a spindle motor 1206B, and a rotary encoder 1206C, which are collectively referred to as the first motor mechanism 1206. The device 1004 includes a sled 1208A, a sled motor 1208B, a linear encoder 1208C, and a rail 1208D, which are collectively referred to as the second motor mechanism 1208. Finally, the mass storage device 1004 includes a controller 1210.

The optical marking mechanism 1202 focuses an optical beam 1204 on the optical disc 100, for at least marking the label side 102 of the optical disc 100, and which also may be used to read from the label side 102 of the disc 100, as well as read from and/or write to the data side 104 of the disc 100. Specifically, the beam source 1202A generates the optical beam 1204, which is focused through the objective lens 1202B onto the optical disc 100, such as in a manner known to those of ordinary skill within the art.

The first motor mechanism 1206 rotates the optical disc 100. Specifically, the optical disc 100 is situated on the spindle 1206A, which is rotated, or moved, by the spindle motor 1206B to a given position specified by the rotary encoder 1206C communicatively coupled to the spindle motor 1206B. The rotary encoder 1206C may include hardware, software, or a combination of hardware and software.

The second motor mechanism 1208 moves the optical marking mechanism 1202 radially relative to the optical disc 100. Specifically, the optical marking mechanism 1202 is situated on the sled 1208A, which is moved on the rail 1208D by the sled motor 1208B to a given position specified by the linear encoder 1208C communicatively coupled to the sled motor 1208B. The linear encoder 1208C may include hardware, software, or a combination of hardware and software.

The controller 1210 controls the marking mechanism 1202 and the motor mechanisms 1206 and 1208 to cause markings, or pixels, to be written to pixel, or marking, positions on the tracks of optical writable label side 102 of the optical disc 100, such as in accordance with an image to be written to the tracks of the label side 102. The controller 1210 may also control the marking mechanism 1202 and the motor mechanisms 1206 and 1208 to write data to the data side 104 of the optical disc 100. In one embodiment, the controller 1210 may further format the information to be optically written to the label side 102, as has been described in the preceding sections of the detailed description. The controller 1210 may include hardware, software, or a combination of hardware and software. The controller 1210 is preferably communicatively coupled to a host device, such as the host device 1002 of FIG. 10, via a communication link. Whereas the formatting of the information is performed in one embodiment by the controller 1210, in another embodiment, as has been described, it is formatted by the host device 1002. Alternatively, responsibility for formatting of the information may be divided between the controller 1210 and the host device 1002.

Furthermore, whereas FIG. 10 shows both a linear encoder 1208C and a rotary encoder 1206C, other embodiments of the invention may not have either or both of the encoders 1208C and 1206C. For instance, the sled motor 1208B may be a stepper mode in which there is no closed-loop feedback, such that the linear encoder 1208C is not present. As another example, rotary encoder 1206C may not be present. In such case, either no rotary encoding is accomplished, or the optical disc 100 itself serves as the encoder, via timing marks printing thereon outside of any image areas.

As can be appreciated by those of ordinary skill within the art, the components depicted in the mass storage device 1004 are representative of one embodiment of the invention, and do not limit all embodiments of the invention. Other approaches can also be employed. As only one example, the sled 1208A may be positioned with the sled motor 1208B, with finer adjustment obtained using a voice coil attached to the beam source 1202A and/or the objective lens 1202B.

Figure 13:
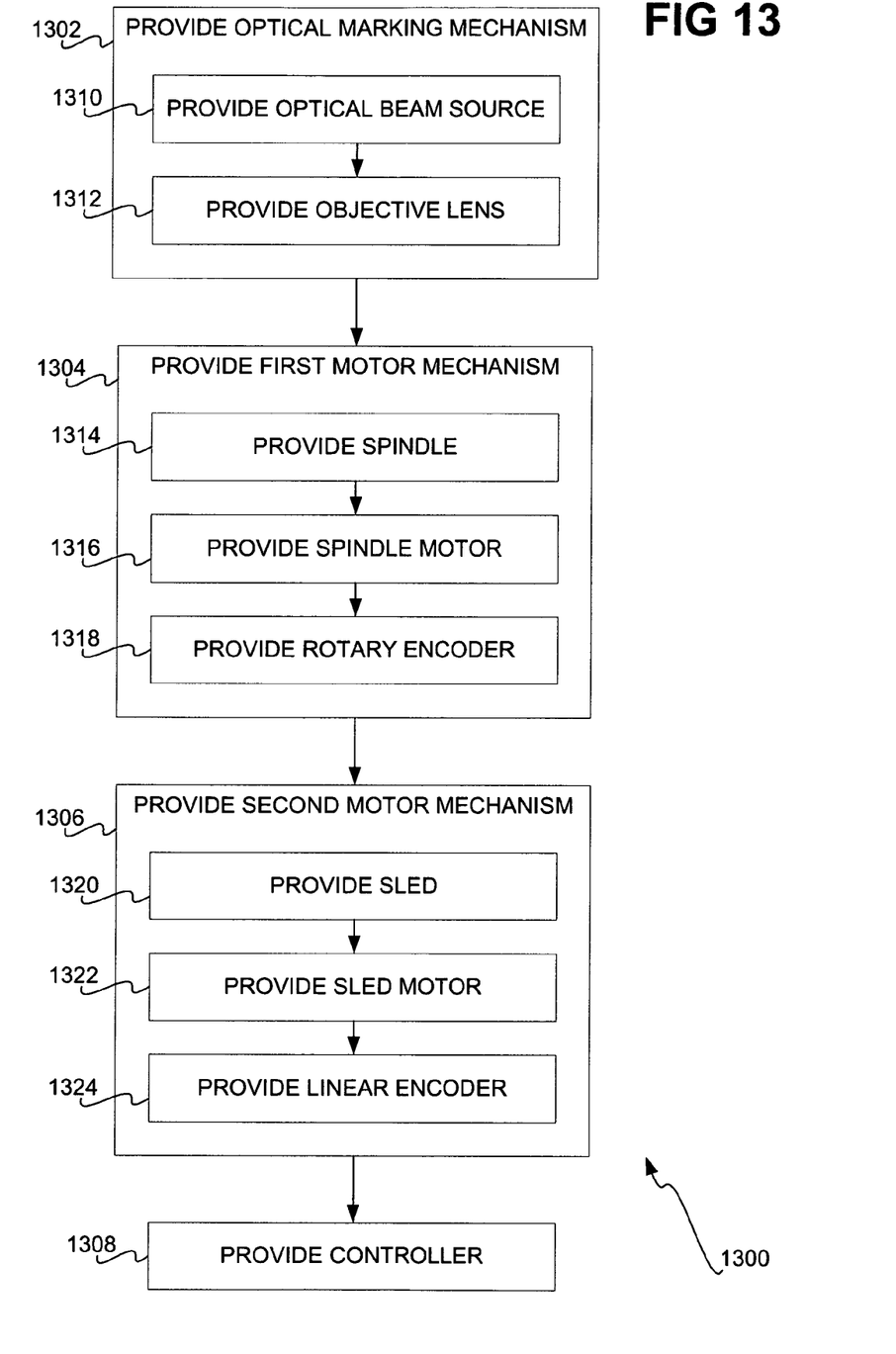
FIG. 13 is a flowchart of a method for manufacturing the mass storage device of FIG. 12, according to an embodiment of the invention.

FIG. 13 shows a method of manufacture 1300 for the mass storage device 1004 of FIG. 12, according to an embodiment of the invention. The method 1300 includes providing the optical marking mechanism 1202 (1302), providing the first motor mechanism 1206 (1304), providing the second motor mechanism 1208 (1306), and providing the controller 1210 (1308). In one embodiment, providing the optical marking mechanism 1202 includes providing the optical beam source 1202A (1310) and the objective lens 1202B (1312), whereas providing the first motor mechanism 1206 in one embodiment includes providing the spindle 1206A (1314), the spindle motor 1206B (1316), and the rotary encoder 1206C (1318). Finally, providing the second motor mechanism 1208 in one embodiment includes providing the sled 1208A (1320), the sled motor 1208B (1322), and the linear encoder 1208C (1324).

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A method comprising:
   receiving information to be optically written on an optically writable label side of an optical disc; and,
   formatting the information so that the information is optically written on a least number of tracks of the optically writable label side of the optical disc to minimize optical writing time of the information to the optically writable label side of the optical disc, comprising:
   formatting the information in a first manner such that the information is curved to fit within the least number of tracks;
   formatting the information in a second manner such that successive lines of the information start within a same track;

displaying to an end user the information formatted in the first manner and formatted in the second manner; and, enabling the end user to select which of the first manner and the second manner in which to have the information formatted.

2. The method of claim 1, further comprising optically writing the information as has been formatted onto the optically writable label side of the optical disc.

3. The method of claim 1, wherein receiving the information to be optically written on the optically writable label side of the optical disc comprises extracting the information from data previously optically written on an optically writable data side of the optical disc opposite to the optically writable label side of the optical disc.

4. The method of claim 3, wherein extracting the information from the data previously optically written on the optically writable data side of the optical disc comprises determining at least one of an album name and an artist name of music data previously written on the optically writable data side of the optical disc.

5. The method of claim 4, wherein extracting the information from the data previously optically written on the optically writable data side of the optical disc further comprises determining one or more song names of music data previously written on the optically writable data side of the optical disc.

6. The method of claim 3, wherein extracting the information from the data previously optically written on the optically writable data side of the optical disc comprises determining at least one of a title and a date of the data previously written on the optically writable data side of the optical disc.

7. The method of claim 6, wherein extracting the information from the data previously optically written on the optically writable data side of the optical disc further comprises determining one or more track titles the data previously written on the optically writable data side of the optical disc.

8. The method of claim 1, wherein receiving the information to be optically written on the optically writable label side of the optical disc comprises receiving at least one of upper optically writable label side information and lower optically writable label side information.

9. The method of claim 8, wherein receiving the information to be optically written on the optically writable label side of the optical disc comprises receiving at least one of upper optically writable label side title information and lower optically writable label side content information.

10. The method of claim 1, wherein formatting the information so that the information is optically written on the least number of tracks of the optically writable label side of the optical disc comprises formatting the information so that the information fits into at least one of a predetermined upper area of the optically writable label side and a predetermined lower area of the optically writable label side of the optical disc.

11. The method of claim 10, wherein formatting the information so that the information is optically written on the least number of tracks of the optically writable label side of the optical disc comprises formatting the information so that the information fits into at least one of a predetermined upper title area of the optically writable label side and a predetermined lower track area of the optically writable label side of the optical disc.

12. The method of claim 10, wherein formatting the information so that the information is optically written on the least number of tracks of the optically writable label side of the optical disc comprises formatting the information so that the information fits into at least one of a predetermined upper title area of the optically writable label side and a predetermined lower date area of the optically writable label side of the optical disc.

13. The method of claim 10, wherein formatting the information so that the information is optically written on the least number of tracks of the optically writable label side of the optical disc comprises formatting the information so that the information fits into at least one of a predetermined upper album name area of the optically writable label side and a predetermined lower artist name area of the optically writable label side of the optical disc.

14. The method of claim 10, wherein formatting the information so that the information is optically written on the least number of tracks of the optically writable label side of the optical disc comprises formatting the information so that the information fits into at least one of a predetermined upper album or artist name area of the optically writable label side and a predetermined lower song name area of the optically writable label side of the optical disc.

15. The method of claim 1, wherein formatting the information so that the information is optically written on the least number of tracks of the optically writable label side of the optical disc comprises curving the information to fit within the least number of tracks.

16. The method of claim 1, wherein formatting the information so that the information is optically written on the least number of tracks of the optically writable label side of the optical disc comprises starting first characters of successive lines of the information within a same track.

17. The method of claim 1, further comprising initially optically writing user-selected data to an optically writable data side of the optical disc opposite to the optically writable label side of the optical disc.

18. A computer-readable medium having a computer program stored thereon to perform a method comprising:

providing data to a mass storage device to optically write the data to an optically writable data region of an optical disc inserted into the mass storage device;

extracting information to be optically written on an optically writable label region of the optical disc from the data;

formatting the information so that the information fits within a predetermined curved area on the optically writable label region of the optical disc and so that the information is optically written on a least number of tracks of the optically writable label region of the optical disc, comprising:

formatting the information in a first manner such that the information is curved to fit within the predetermined curved area;

formatting the information in a second manner such that first characters of successive lines of the information start within a same track of the predetermined curved area;

providing the information formatted in the first manner and in the second manner to a display device to display to an end user the information formatted in the first manner and in the second manner; and, receiving data from an input device corresponding to a selection by the end user of which of the first manner and the second manner in which to have the information formatted; and, providing the information as formatted to the mass storage device to optically write the information to the predetermined curved area on the optically writable label region of the optical disc.

19. The medium of claim 18, wherein formatting the information so that the information fits within the predetermined curved area on the optically writable label region of the optical disc comprises curving the information to fit within the predetermined curved area.

20. The medium of claim 18, wherein formatting the information so that the information fits within the predetermined curved area on the optically writable label region of the optical disc comprises starting first characters of successive lines of the information within a same track of the predetermined curved area.

21. A system comprising:
a mass storage device capable of optically writing information to an optically writable label side of an optical disc; and,
a computer program to format the information so that the information is optically written to a least number of tracks on the optically writable label side of the optical disc in a shortest length of time, the computer program to:
format the information in a first manner such that the information is curved to fit within the predetermined curved area;
format the information in a second manner such that first characters of successive lines of the information start within a same track of the predetermined curved area;
provide the information formatted in the first manner and in the second manner to a display device to display to an end user the information formatted in the first manner and in the second manner; and,
receive data from an input device corresponding to a selection by the end user of which of the first manner and the second manner in which to have the information formatted.

22. The system of claim 21, further comprising a host computing device communicatively coupled to the mass storage device and having a computer-readable medium on which the computer program is stored and from which the computer program is executed.

23. The system of claim 21, further comprising the display device so that an end user is able to approve formatting of the information prior to optical writing of the information to the optically writable label side of the optical disc.

24. The system of claim 23, wherein the mass storage device includes a computer-readable medium on which the computer program is stored and from which the computer program is executed, the display device embedded within the mass storage device.

25. A system comprising:
a mass storage device capable of optically writing information to an optically writable label side of an optical disc; and,
means for formatting the information so that the information is optically written to a least number of tracks on the optically writable label side of the optical disc in a shortest length of time, by; formatting the information in a first manner such that the information is curved to fit within the predetermined curved area;
formatting the information in a second manner such that first characters of successive lines of the information start within a same track of the predetermined curved area;
providing the information formatted in the first manner and in the second manner to a display device to display to an end user the information formatted in the first manner and in the second manner; and,
receiving data from an input device corresponding to a selection by the end user of which of the first manner and the second manner in which to have the information formatted.

26. A mass storage device comprising:
an optical marking mechanism to at least optically write information to an optically writable label region of an optical disc; and,
a controller to format the information so that the information is optically written on a least number of tracks of the optically writable label side of the optical disc, by:
formatting the information in a first manner such that the information is curved to fit within the predetermined curved area;
formatting the information in a second manner such that first characters of successive lines of the information start within a same track of the predetermined curved area;
providing the information formatted in the first manner and in the second manner to a display device to display to an end user the information formatted in the first manner and in the second manner; and,
receiving data from an input device corresponding to a selection by the end user of which of the first manner and the second manner in which to have the information formatted.

27. The mass storage device of claim 26, wherein the controller is to further format the information so that the information is optically written to the optically writable label side of the optical disc in a shortest length of time.

28. The mass storage device of claim 26, wherein the controller is to further format the information so that the information fits within a predetermined area of the optically writable label side of the optical disc.

29. A mass storage device comprising:
means for optically writing information to an optically writable label region of an optical disc; and,
means for formatting the information so that the information is optically written on a least number of tracks of the optically writable label side of the optical disc, by:
formatting the information in a first manner such that the information is curved to fit within the predetermined curved area;
formatting the information in a second manner such that first characters of successive lines of the information start within a same track of the predetermined curved area;
providing the information formatted in the first manner and in the second manner to a display device to display to an end user the information formatted in the first manner and in the second manner; and,
receiving data from an input device corresponding to a selection by the end user of which of the first manner and the second manner in which to have the information formatted.

30. The mass storage device of claim 29, wherein the means for formatting the information is further for formatting the information so that the information is optically written to the optically writable label side of the optical disc in a shortest length of time.

31. The mass storage device of claim 29, wherein the means for formatting the information is further for formatting the information so that the information fits within a predetermined area of the optically writable label side of the optical disc.

32. A method for manufacturing a mass storage device comprising:
providing an optical marking mechanism that is able to at least optically write information on an optically writable label side of an optical disc;
providing a plurality of motor mechanisms that are able to rotate the optical disc and to move the optical marking mechanism radially relative to the optical disc; and,
providing a controller that is able to format the information so that the information is optically written on a least number of tracks of the optically writable label side of the optical disc and the information fits within a predetermined area of the optically writable label side of the optical disc, so as to minimize optical writing time of the information to the optically writable label side of the optical disc, by:

formatting the information in a first manner such that the information is curved to fit within the predetermined curved area;

formating the information in a second manner such that first characters of successive lines of the information start within a same track of the predetermined curved area;

providing the information formatted in the first manner and in the second manner to a display device to display to an end user the information formatted in the first manner and in the second manner; and, receiving data from an input device corresponding to a selection by the end user of which of the first manner and the second manner in which to have the information formatted.

* * * * *

UNITED STATES PATENT AND TRADEMARK OFFICE
CERTIFICATE OF CORRECTION

PATENT NO.       : 7,095,429 B2
APPLICATION NO.  : 10/644423
DATED            : August 22, 2006
INVENTOR(S)      : David M. Kwasny et al.

It is certified that error appears in the above-identified patent and that said Letters Patent is hereby corrected as shown below:

In column 13, line 59, in Claim 25, delete "by;" and insert -- by: --, therefor.

In column 16, line 4, in Claim 32, delete "formating" and insert -- formatting --, therefor.

Signed and Sealed this

Eighteenth Day of August, 2009

David J. Kappos
*Director of the United States Patent and Trademark Office*